R. L. CREWS AND G. F. SMITH.
SAWING MACHINE.
APPLICATION FILED JAN. 17, 1918.

1,302,770.

Patented May 6, 1919.
3 SHEETS—SHEET 1.

Inventors
Ralph L. Crews &
George F. Smith,
By
Attorney

R. L. CREWS AND G. F. SMITH.
SAWING MACHINE.
APPLICATION FILED JAN. 17, 1918.

1,302,770.

Patented May 6, 1919.
3 SHEETS—SHEET 2.

R. L. CREWS AND G. F. SMITH.
SAWING MACHINE.
APPLICATION FILED JAN. 17, 1918.

1,302,770.

Patented May 6, 1919.
3 SHEETS—SHEET 3.

UNITED STATES PATENT OFFICE.

RALPH L. CREWS AND GEORGE F. SMITH, OF WINSTON-SALEM, NORTH CAROLINA.

SAWING-MACHINE.

1,302,770.          Specification of Letters Patent.      Patented May 6, 1919.

Application filed January 17, 1918. Serial No. 212,271.

*To all whom it may concern:*

Be it known that we, RALPH L. CREWS and GEORGE F. SMITH, citizens of the United States of America, and residents of Winston-Salem, in the county of Forsyth and State of North Carolina, have invented certain new and useful Improvements in Sawing-Machines, of which the following is a specification.

This invention relates to sawing machines and particularly to machines designed for sawing trees for felling the same and for cutting the trees into appropriate lengths after they have fallen.

An object of this invention is to provide novel means whereby a saw may be reciprocated when in a horizontal position, means being also provided for reciprocating the saw in vertical position, the first mentioned saw operating means being operative to cut a tree when standing and the second mentioned saw being adapted for use in cross cutting the tree at any one or more points so that it may be divided into sections.

A further object of this invention is to provide novel means for clamping the log or felled tree with relation to the frame of the sawing mechanism for the purpose of holding the parts in operative relation.

A still further object of this invention is to provide saw operating mechanism and means operating in conjunction with the traction wheels for moving the saw and sawing machine from place to place.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1:
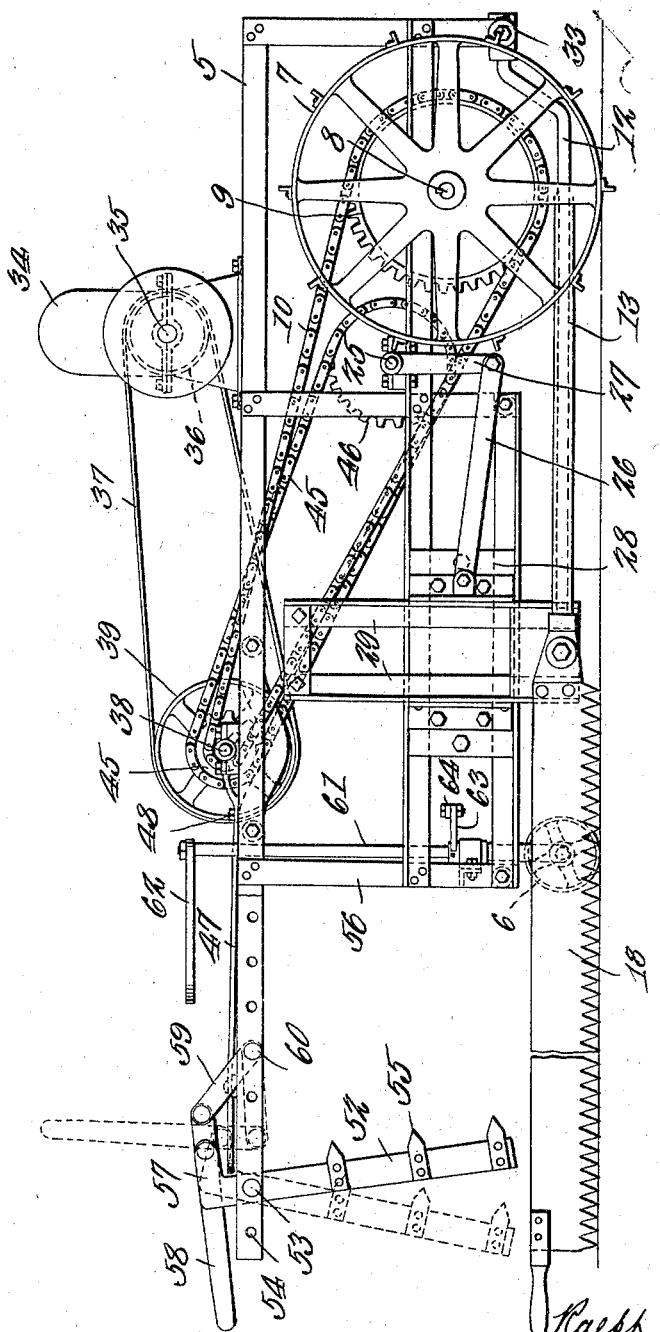
Figure 1 illustrates a view in elevation.
Figure 2:
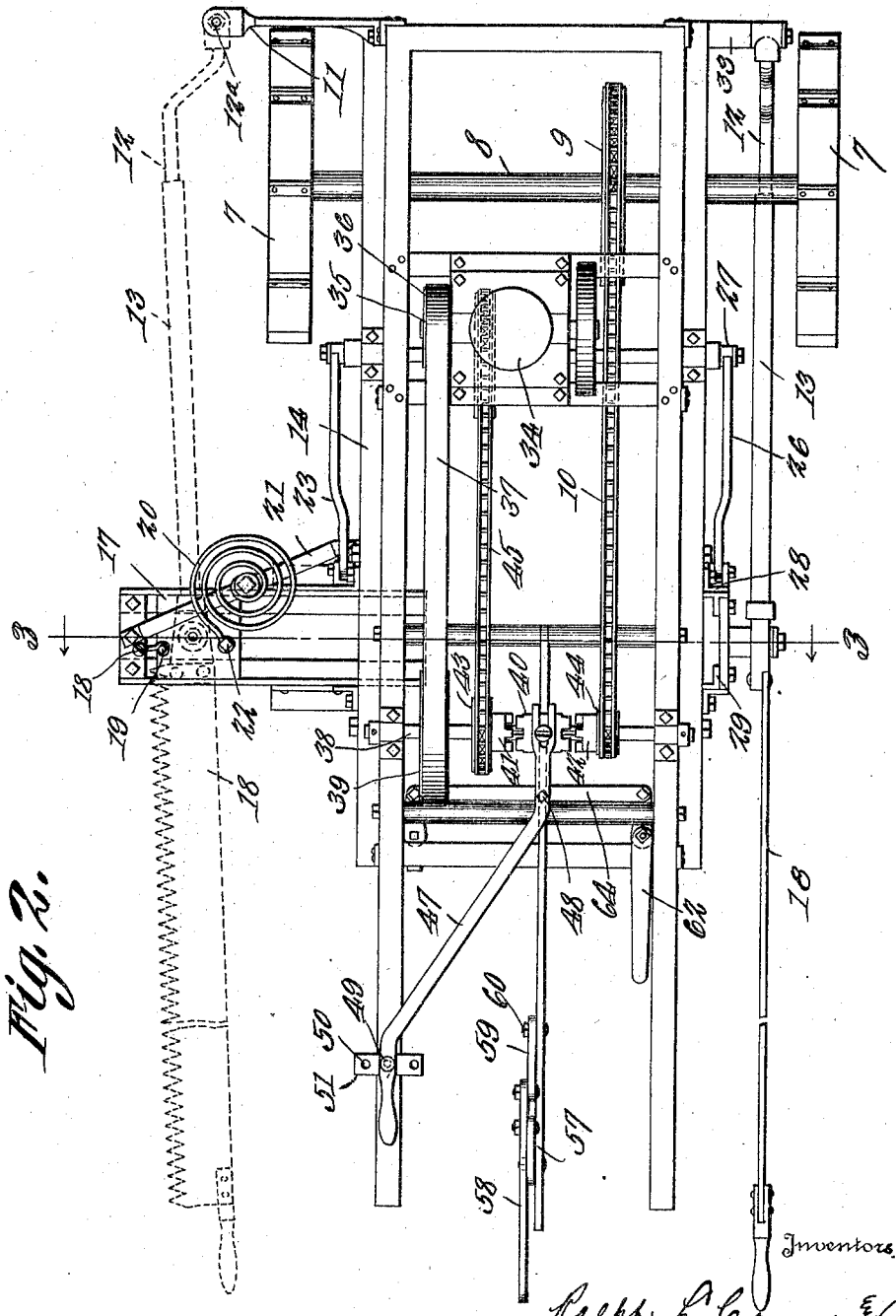
Fig. 2 illustrates a top plan view.
Figure 3:
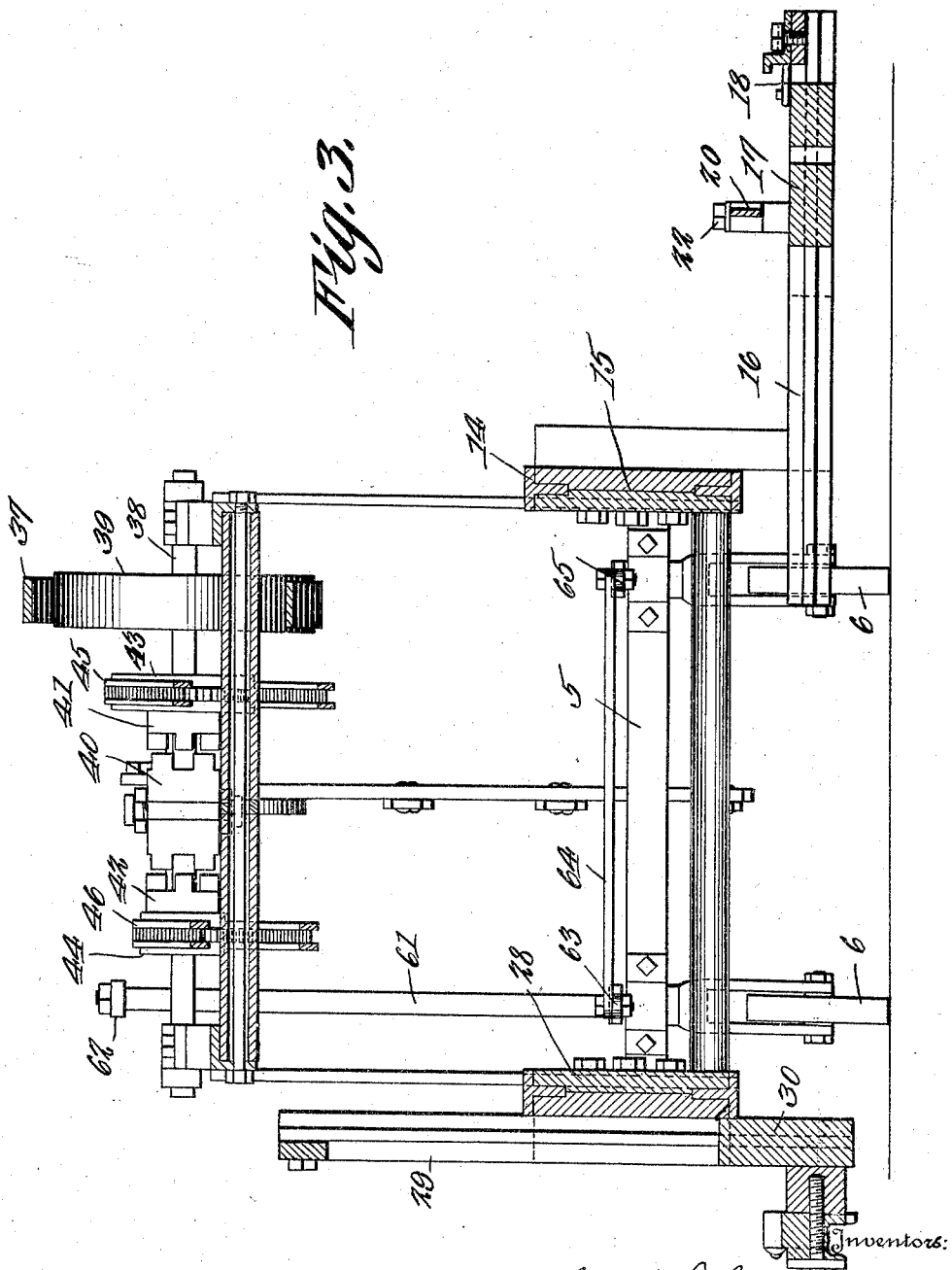
Fig. 3 illustrates a sectional view on the line 3—3 of Fig. 2.

In these drawings 5 denotes the truck frame, 6 the front guiding wheels, 7 the traction wheels on which the frame is mounted, the said traction wheels being mounted on an axle 8 which may be journaled in any suitable manner to the frame. The axle 8 has a sprocket wheel 9 engaged by a sprocket chain 10 which is driven in a manner to be hereinafter described.

At the rear of the frame, there is a transversely disposed arm 11 which supports a guide rod 12 on which a sleeve 13 reciprocates. On the side of the frame from which the arm 11 projects, there is a guide 14 in which a cross head 15 reciprocates, the said cross head carrying a frame 16 constituting a guide for a head 17 which head carries a saw 18, the blade of which is in horizontal position and the teeth of which face outwardly. The head 17 is held at the limit of its outward movement by a hook 18 which engages the stud 19 of the head and the said head is normally forced outwardly under the tension of a spring 20 which has one end anchored to a brace 21 and the opposite end connected to a stud 22 on the head 17. The function of the spring is to force the head normally outward so as to effect the feeding of the saw during the cutting operation. The cross head 15 is reciprocated by the action of the pitman 23 which is connected to an arm 24 carried by the shaft 25, the said shaft 25 also carrying a pitman 26 on the opposite side of the machine which is connected to the crank 27 and to the cross head 28 for the purpose of reciprocating the cross head. The cross head 28 has a vertically disposed guide 29 in which a head 17 is guided when used on one side of the machine, the said head 17 being connected to the saw 18 which is adapted to operate vertically for the purpose of cutting logs and the like. The head 17 has its rearwardly extending sleeve 13 and the guiding rod 12 mounted on an arm 33 to swing vertically. The connection between the arm 11 and rod 12 is a vertical pivot 12$^a$ so that the rod 12 may swing horizontally.

A motor 34 is mounted on the frame and the motor shaft 35 has a pulley 36 thereon engaged by a belt 37 for driving a shaft 38 through the medium of a pulley 39. The shaft 38 has a clutch 40 slidable on it and it is adapted to be moved into engagement with the clutch member 41 or a clutch member 42, the former of which is connected to a sprocket wheel 43 and the latter of which is connected to a sprocket wheel 44 so that motion may be communicated to either of the sprockets through the operation of the clutch. The sprocket chain 45 engages the sprocket wheel 43 and operates over a sprocket wheel 46 mounted on the shaft 25 and therefore as the shaft 38 is driven, the clutch member may be adjusted so as to operate the saws.

It will be seen from the foregoing description that the saw and certain of the parts associated with it may be used on either side of the machine and in position to cut vertically or horizontally.

The sprocket chain 10 operates over the sprocket wheel 44 which is rotated through the clutch member 40 heretofore described and this connection is made and employed when the traction wheels are to be used for moving the machine from place to place. The clutch member is moved by a lever 47 which is oscillatably mounted on a pivot 48 and the lever is held at different positions of adjustment by a pin 49 which passes through the lever and is adapted to enter one of the apertures 50 of the plate 51 so that the clutch may be held in engagement with either of the clutch members.

As a means for clamping the log when it is to be sawed, a clamping member 52 is provided and is mounted on a pivot 53 which passes through one of the apertures 54 of the frame, and the said clamping member is oscillatable so that the teeth 55 thereof may be caused to engage the log to force it or clamp it against the end 56 of the frame. The upper end of the clamping member has an angular extension 57 which is pivotally connected to an operating handle 58, said operating handle being also pivoted to a link 59 mounted on a pivot 60 in one of the apertures 54; said handle being operative, therefore, to oscillate the clamping member as shown in full and dotted lines in Fig. 1. It is obvious that by the operation of the levers, the clamping members may be moved, as indicated.

The front truck wheels 6 are actuated or moved to guide the machine through the medium of the steering post 61 which has a tiller 62, said steering post having an arm 63 to which a link 64 is pivoted, the link 64 in turn being pivoted to an arm 65 which controls the wheel on the opposite side of the frame.

The saw is connected to the head by a wrist pin so that it can be readily removed for the purpose of transferring it from one side of the frame to the other.

We claim—

In a sawing machine, a truck, a frame, a guide on each side of the frame, a cross head mounted in each of the said guides, a vertically disposed guide carried by one of the cross heads and a horizontally disposed guide carried by the opposite cross head, means for reciprocating the cross heads, a guiding rod, means on each side of the frame for supporting the guiding rod, a vertically disposed pivot included in the means for supporting the said rod on one side, and a horizontally disposed pivot included in the means for supporting the rod on the opposite side, a guiding sleeve embracing the rod, a cross head to which the sleeve is connected, said cross head being adapted to operate in conjunction with the vertically disposed or the horizontally disposed guide, and a saw attached to the cross head.

RALPH L. CREWS.
GEORGE F. SMITH.

Copies of this patent may be obtained for five cents each, by addressing the "Commissioner of Patents, Washington, D. C."